(12) United States Patent
Margulis et al.

(10) Patent No.: US 7,421,715 B1
(45) Date of Patent: Sep. 2, 2008

(54) SYSTEM AND METHOD FOR DYNAMIC LATE-BINDING OF PERSISTENT OBJECT IMPLEMENTATIONS IN SOFTWARE-BASED SYSTEMS

(75) Inventors: Efim Margulis, Ashdod (IL); Moshe Ilan Rozenblat, Lexington, MA (US)

(73) Assignee: Cerylion, Inc., Burlington, MA (US)

( * ) Notice: Subject to any disclaimer, the term of this patent is extended or adjusted under 35 U.S.C. 154(b) by 494 days.

(21) Appl. No.: 11/054,252

(22) Filed: Feb. 9, 2005

(51) Int. Cl.
G06F 13/00 (2006.01)

(52) U.S. Cl. .................................. 719/331; 719/332
(58) Field of Classification Search ................ 719/331, 719/332
See application file for complete search history.

(56) References Cited

U.S. PATENT DOCUMENTS 5,872,973 A * 2/1999 Mitchell et al. ............. 719/332
5,983,021 A * 11/1999 Mitrovic ..................... 717/158
6,675,227 B1 * 1/2004 Gavrilo et al. .............. 719/316
6,757,720 B1 * 6/2004 Weschler, Jr. ............... 709/220
7,246,358 B2 * 7/2007 Chinnici et al. ............. 719/315
2006/0150172 A1 * 7/2006 Heath et al. ................. 717/162

* cited by examiner

Primary Examiner—Andy Ho
(74) Attorney, Agent, or Firm—David A. Dagg

(57) ABSTRACT

A system and method for binding software objects to the program code that implements them in accordance with runtime object typing that is independent of the program code typing system. Persistently-stored, run-time object instances ("persistent objects") are maintained by a software-based system across transactions, user sessions, and application executions, and are identified by unique, typed names. Dynamic binding is provided through software constructs that are associated with corresponding persistent objects, and referred to as "Associators". Associators provide links between object types and the program code that implements them.

39 Claims, 8 Drawing Sheets

SYSTEM AND METHOD FOR DYNAMIC LATE-BINDING OF PERSISTENT OBJECT IMPLEMENTATIONS IN SOFTWARE-BASED SYSTEMS

FIELD OF THE INVENTION

The present invention relates generally to software-based systems, and more specifically to a method and system for dynamic late-binding of persistent object implementations in software-based systems.

BACKGROUND OF THE INVENTION

Software-based systems are considered to be some of the most complex artifacts developed and managed by mankind. The single largest factor contributing to software-based system complexity is the combinatorial impact of variances of conditional logic. For a software-based system having a set of N condition variables defining its state, a deterministic logic has to unequivocally define the system's correct behavior in all $N^{-1}$ permutations and combinations of those variables. As software-based systems have grown in their scope and application, such complexity has increasingly degraded their overall quality, performance, predictability and manageability.

The evolution of software development into software engineering illustrates how this high degree of complexity has been approached. The discipline of software engineering itself was intended to transform software development from what was previously mostly an art form into more of a science. Accordingly, software engineering attempted to define a general theory of software development, from which related methods and processes could be deduced, and applied to real problems. During what may be considered the first generation of software engineering, software developers employed functional decomposition techniques. Using functional decomposition, software systems are constructed using a top-down approach, through successive refinement of software modules encapsulating increasingly more granular function points. In these techniques, implied or explicit deliverables of a "Structured Analysis" requirements analysis method are translated into a "Structured Design" top-down design, from which implied or explicit deliverables are translated into "Structured Programming" constructs.

Notwithstanding the benefits obtained by consistent application of functional decomposition, every change in the state variables of the resulting software-based systems, or in the conditions that bind them to each either, still triggered a 'ripple effect' requiring identification of all impacted function points, and potentially refinement of conditional logic in many code modules. Thus, while educating and training software developers was made easier, the manageability of increasing complex software-based systems was not substantially improved.

Object-based software development emerged in the 1980s, and changed the defining principle behind software modules from structured functions to abstract data types. Abstract data types leverage the fact that data objects are more stable anchors for software system design than the ever changing function points. In object-based software development, the principle of information hiding allows modules to isolate changes in their variances from other modules by providing access methods for their associated data. The conceptual premise of object-based software development, and the preliminary indications of increased productivity and reliability, were well received. For example, the United States Department of Defense issued requirements for using the ADA object-based programming language in its software-based systems.

Unfortunately, the benefits of object-based software development proved to be exaggerated. A key limitation was the requirement to pre-design and pre-program all permutations and combinations of abstract data types as distinctively typed software modules. Once again, the inherent complexity of the combinatorial impact of significant code changes after compilation, and potentially after deployment, became a limiting factor.

The introduction of object-oriented (OO) software development added late-binding through run-time instantiation of objects, and the principle of inheritance became a primary method for providing objects with late-binding in object-oriented systems. Object-oriented programming languages, such as C++, Eiffel, Java, and C#, provide inheritance for abstract data-types of objects that are typed when they are instantiated at run-time. In this type of system, a class is a software module encapsulating an abstract data-type, similar to the package concept in an object-based language, while an object is an instance of a class that is generated at run-time. A class can be defined as an extension (an "heir") of another class, and thereby "inherit" the methods and properties of that other class, and reuse them in the heir class. Inheritance often eliminates the need to recode common methods and properties for different classes. In addition to using inherited methods and properties, an inheriting class can also override them as well as add new methods and properties of its own. Advantageously, a change to a given class is automatically applied to all its heirs.

Run-time systems supporting object orientation enable late-binding of objects through inheritance graphs that are pre-defined by the objects' classes. A linker, compiler or interpreter generates the instruction-set for traversing the inheritance graph of a set of software components compiled together as a single binary module. The run-time system instantiates the objects and resolves their methods and properties in accordance with the inheritance graphs of their binding modules. Single Inheritance, Multiple Inheritance and Interface Inheritance are featured in various ones of these systems. Polymorphism is a complementary technique available through object-oriented systems for enabling multiple implementations of methods. However, polymorphism is highly discouraged by software engineering methodologies due to its infringement of the principle of information hiding.

Object-oriented software development technologies have become the preferred tools for software engineering. Most software allows the use of object-oriented systems, thus enabling late-binding through Inheritance, either through a programming language's specific run-time system (i.e. Java), or through a run-time system shared by multiple programming languages (i.e. Microsoft.Net). Unfortunately, the success of object-oriented software in reducing overall complexity has been limited.

First, it should be recognized that the inheritance relationships for object-oriented programs developed using existing object-oriented systems are pre-defined at compile time or (link time) by their classes. All components in a given inheritance graph have to be compiled together into a single binary module, and a change to any component may require re-compiling, possibly re-linking, and re-deploying of a new binary module. Accordingly, singular or relatively limited changes can impact software system deployment. Second, since inheritance is tightly-coupled to a given set of classes, a change in any given class may impact all the heirs of that class. Accordingly, a large number of potential side-effects on other classes may need to be carefully evaluated and tested.

These shortcomings relate significantly to the fact that inheritance is a class property rather than an object property, as well as to the limitation of bounding the late-binding of application objects to the single inheritance graph of their classes as defined for each application at compile time. As shown in FIG. 1, an inheritance relationship 10 between $Class_1$ and $Class_2$ is present at Design-Time 12, when the Object Definitions 16a are provided, while at Run Time 18 the Compiled Code 14 following compilation 15 instantiates Runtime Objects 16 resulting in Object Instances $O_{1a}$ and $O_{2a}$. As shown in FIG. 2, a desired change 20 may need to be made through a design time change 22, and result in re-compiling 24, followed by re-deployment of the new version of the Compiled Code 26, and possibly updating the Runtime Objects 16 through the new Object Definitions 17a resulting in Object Instances $O_{1b}$ and $O_{2b}$ in the new Runtime Objects 17b.

FIGS. 3 and 4 illustrate the effect of the fact that Inheritance in existing systems is tightly-coupled to a development time class hierarchy. In FIG. 3, a change to Class $C_{19}$ 31 in the Class hierarchy 32 is made at development time 30 in order to change the associated class program 36 in the class programs 38 after compilation 34. As a result, at Run-Time 39, within the data objects 42 used at Run-Time 39, there are associated changed data objects 40. In FIG. 4, at development time 64, a change to the Class $C_2$ 50 results in changes to its heir Classes 52. After compilation 58, the class programs 56 include modified class programs 54, which result in the modified data objects 60 at Run-Time 66.

Thus, as shown in FIGS. 3 and 4, the principle of inheritance can explode the total number of changes needed to provide a significant program change at a high level within the class hierarchy of a program. Accordingly, the complexity represented in the class hierarchy is still a fundamental problem when maintaining and modifying a software-based system. The use of inheritance in programming therefore becomes an exercise in trade-offs, since the reduced complexity enabled by late binding comes with a degree of increased complexity in managing side-effects of code modifications in a given application. Furthermore, notwithstanding any of the current advancement in modern compilers, integrated development environments and runtime system frameworks, the utility of object-oriented software engineering methods to contemporary applications is still bounded by two fundamental system-level limitations:

1) the scope of late-binding is limited to the inheritance-graph of a given application; and 2) the utility of late-binding is limited to a single phase in objects' life-cycle: while they are stored in-memory. At all other phases in the life-cycle, before and after objects are loaded into the computer's memory, are managed by different systems using different methods.

While database systems indeed manage the persistent storage of data derived from objects, neither late-binding nor other aspects of these objects, as indicated by their applications, are being applied to persistent storage. As a result, it can be said that years of practicing object-oriented methods with current systems has resulted in only a minimal net contribution to the reduction of costs and complexity, particularly as encountered when modifying previously deployed software-based systems.

SUMMARY OF THE INVENTION

To address the above described and other shortcomings of the prior art, a system and method are disclosed for creating and managing persistent objects that enables dynamic binding at runtime to multiple implementations, within a given application, and across different applications. The disclosed system uses persistently-stored, run-time object instances ("persistent objects") that are maintained across transactions, user sessions, and application executions, and that are identified by unique, typed names. The disclosed system may be embodied such that it maintains persistent objects in files, databases or any other type of persistent storage system, and using various media formats provided by contemporary persistent storage systems. Many important, software-based systems need to manage objects across transactions, user sessions, and application executions, and the disclosed system advantageously provides the benefits of late-binding to these persistent software objects.

The disclosed system may further be embodied in programs delivered to a computer or other software-based system in various forms, including, for example, runtime systems supporting object-oriented languages and providing direct representation of classes, objects and other object oriented concepts, as well as other operating environments enabling indirect implementations of object oriented methods and concepts by supporting dynamic allocation of memory, or by enabling dynamic loading of static code.

The disclosed system provides persistent objects with an object typing system that is independent of the class typing system that is defined at compile-time or link-time. The disclosed system stores the type of each object at the time the object is stored or updated in persistent storage. Therefore, unlike the traditional class-based typing that is recognized only by the application that instantiates the objects, the typing of persistent objects managed by the disclosed system may be accessible to any other application provisioned with relevant access rights, and any such application can load them to memory and process their methods and properties.

The disclosed system also provides a special-purpose software construct (referred to as "Associator") enabling the mapping of object types to classes that implement them. The disclosed system defines Associators as (i) A MapTable Associator containing pairs of object types and classes; and (ii) a Lookup Associator that contains a sequence of MapTable Associators. System architects, software designers, or other practitioners such as system analysts, can implement any number of Associators of either type. The disclosed system maintains in persistent storage a registry of all Associators and enables provisioned users to update this registry at any point in time.

The disclosed system may further include a runtime environment providing each instance of a provisioned application with a single runtime object (referred to as "Root Associator") being assigned with the responsibility for identifying and retrieving the class that should be activated for handling object requests per a given object type. The disclosed system provides a default Root Associator in its registry, and each application can override it and assign any other Associator as its Root Associator, or change it during runtime with respect to different contexts of its execution. Accordingly, software-based systems can maintain their Root Associators in persistent storage and allow system architects, software designers, or other practitioners such as system analysts, to update their root associators on an as-needed basis.

Software-based management and configuration systems have been replacing previous generation hardwired control systems in diverse instruments such as communication switchboards, medical instruments and Cable TV sets. Novel inventions allowed for remote control, maintenance and upgrade of a complex apparatus without having to recall the device to the very same factory that created it, disassemble, rebuild and ship it back to its destination. Diverse industries such as telecom, healthcare and consumer electronics have reduced by orders of magnitude the maintenance cost and time for complex devices, and unlocked new economies of scale for their goods. At the time that the combinatorial impact of software changes becomes the single largest risk factor limiting the utility of software itself, the disclosed system and method for dynamic late binding of persistent object implementations changes the time and space dimension of updating and configuring persistent objects, and enables similar benefits to those providing software-based systems. The disclosed system for creating and managing persistent objects that carry their type independent of the class typing system, including the disclosed Associators, Root Associators, and the disclosed object-binding lookup process, provides a flexible method for changing the runtime binding of persistent objects, and advantageously overcomes limitations associated with prior art. Advantages include the fact that run time changes made through Associators have no side effects in the compile-time class hierarchy, and there is therefore no need to recompile, re-link, and redeploy unaffected applications, thus avoiding the potentially combinatorial impact of changes in the original class hierarchy. Moreover, while avoiding such Inheritance side-effects, run time changes made through the disclosed Associators also extend the scope of late-binding from the boundaries of the application that instantiates objects to all other applications that may be provisioned by an embodiment of the disclosed system, thereby enabling them to reuse each other's objects as well as extending or changing them without increasing the complexity of the overall software-based system. Furthermore, late-binding's key benefit of reducing the complexity underlying variances of conditional logic is extended by the disclosed system into the development and management of persistent objects maintained across transactions, user sessions, and application executions.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
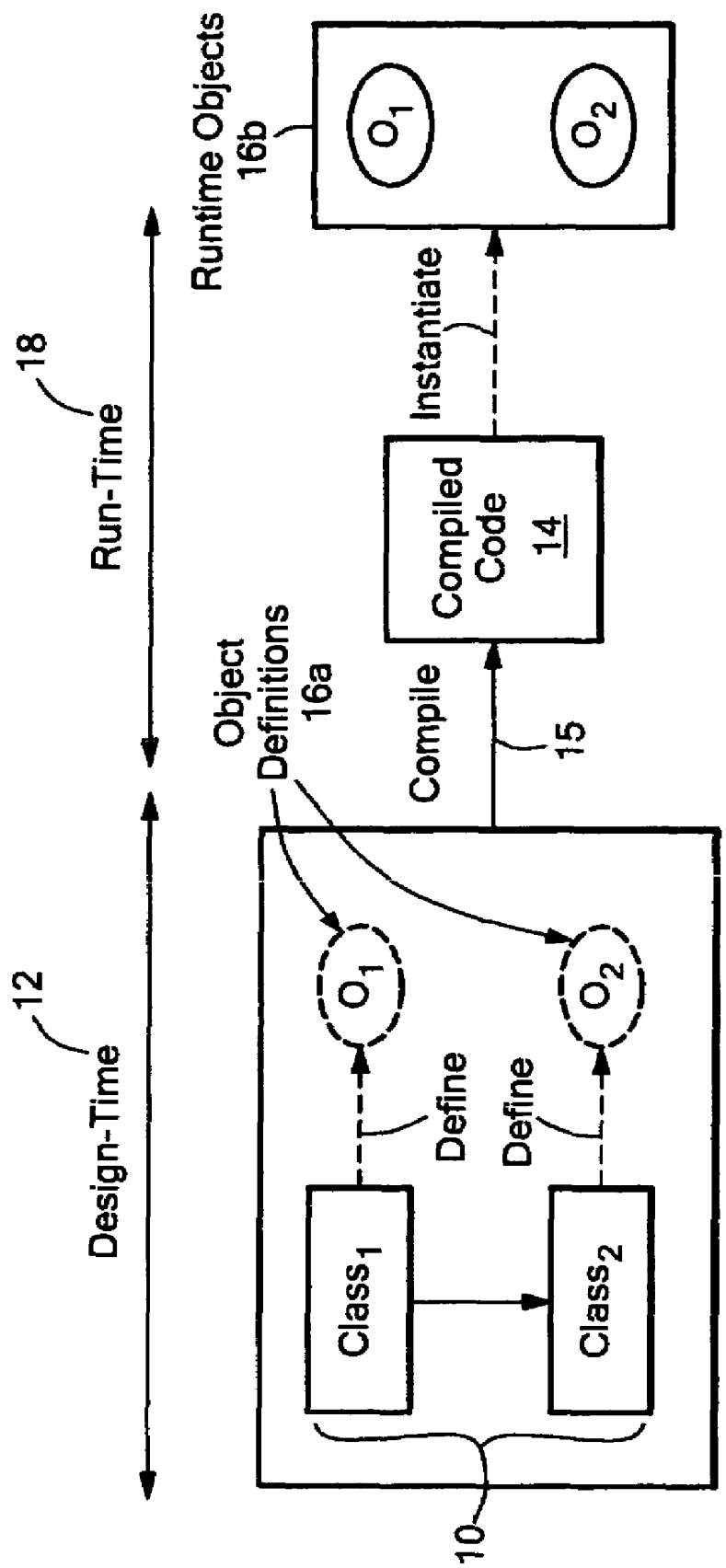
FIG. 1 is a block diagram illustrating inheritance as a design time property.
Figure 2:
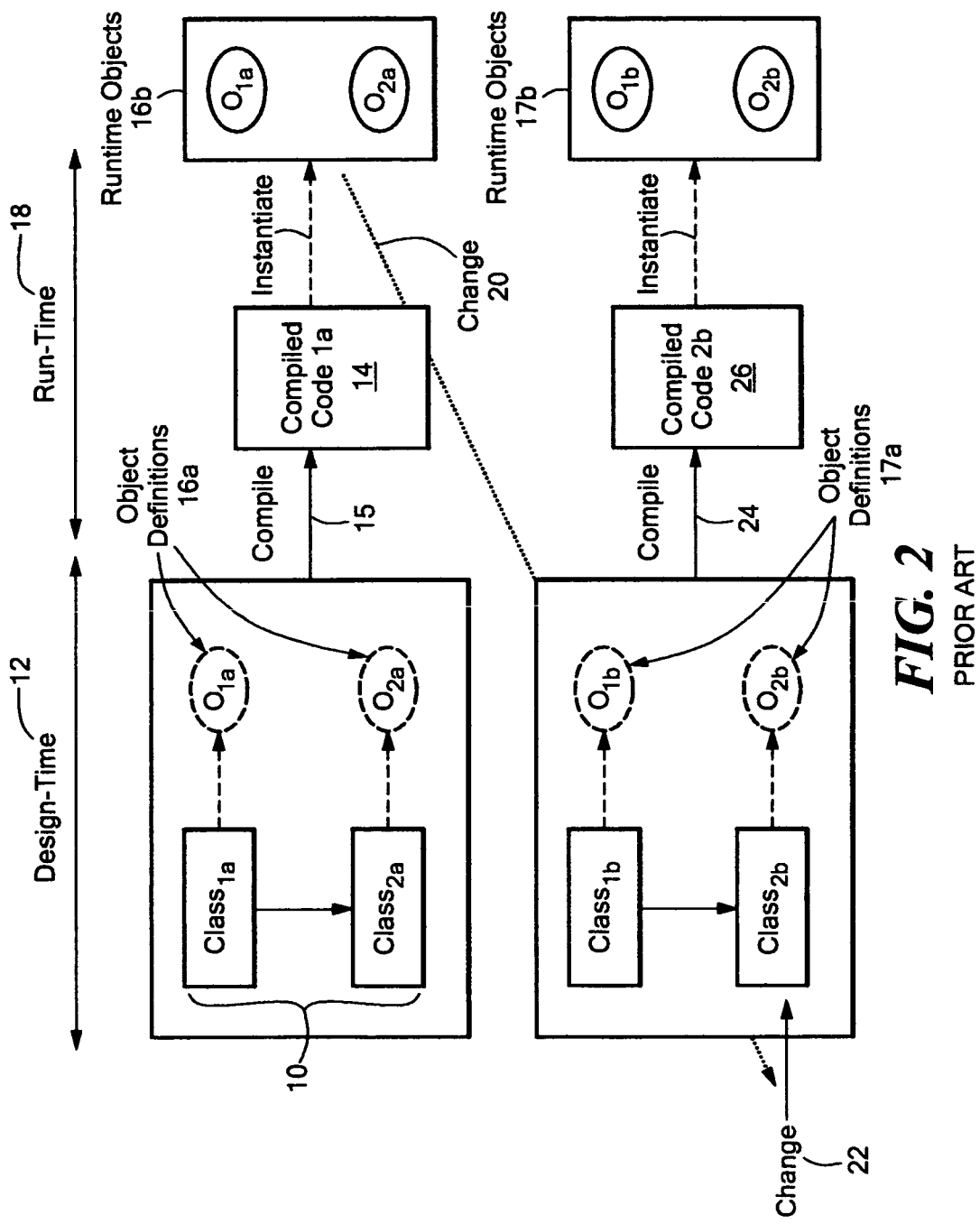
FIG. 2 is a block diagram illustrating how changes result in recompiling and redeploying a whole code module.
Figure 3:
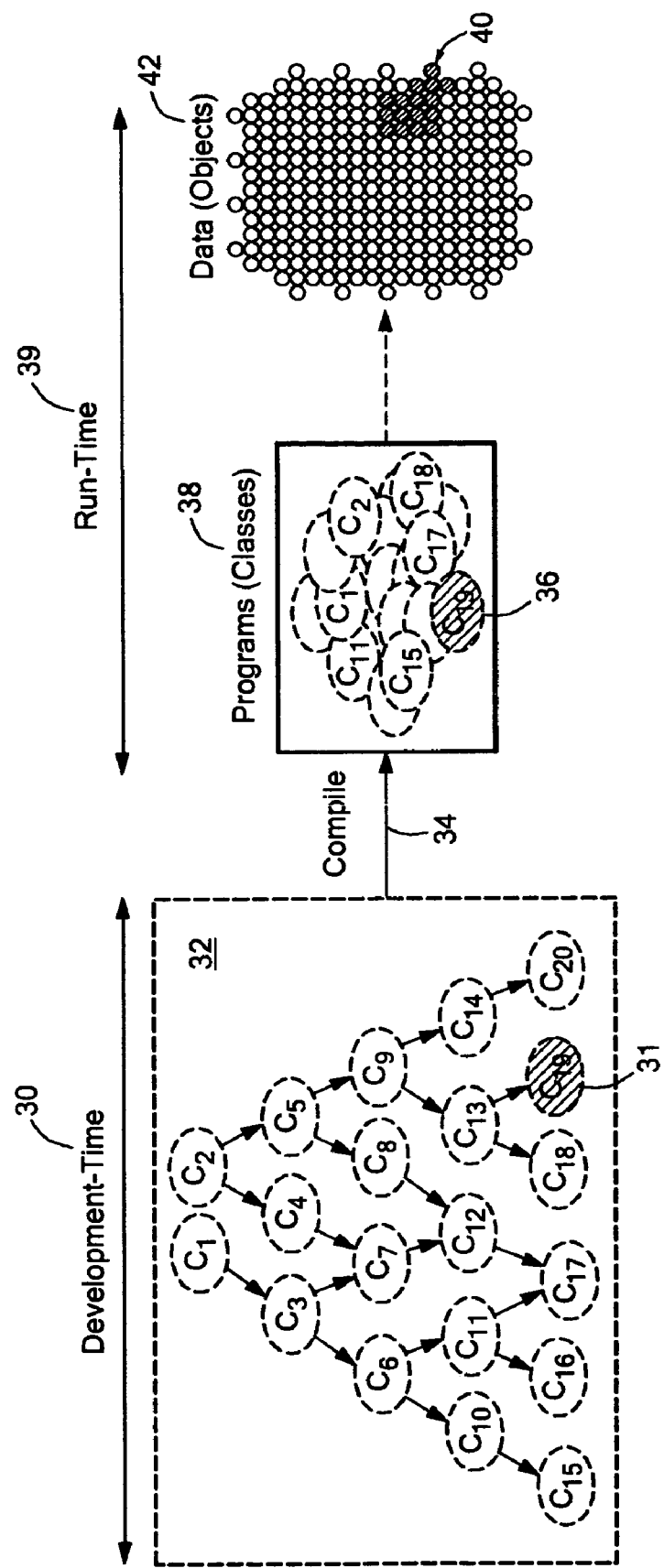
FIG. 3 is a block diagram illustrating how inheritance is tightly coupled to a development time class hierarchy.
Figure 4:
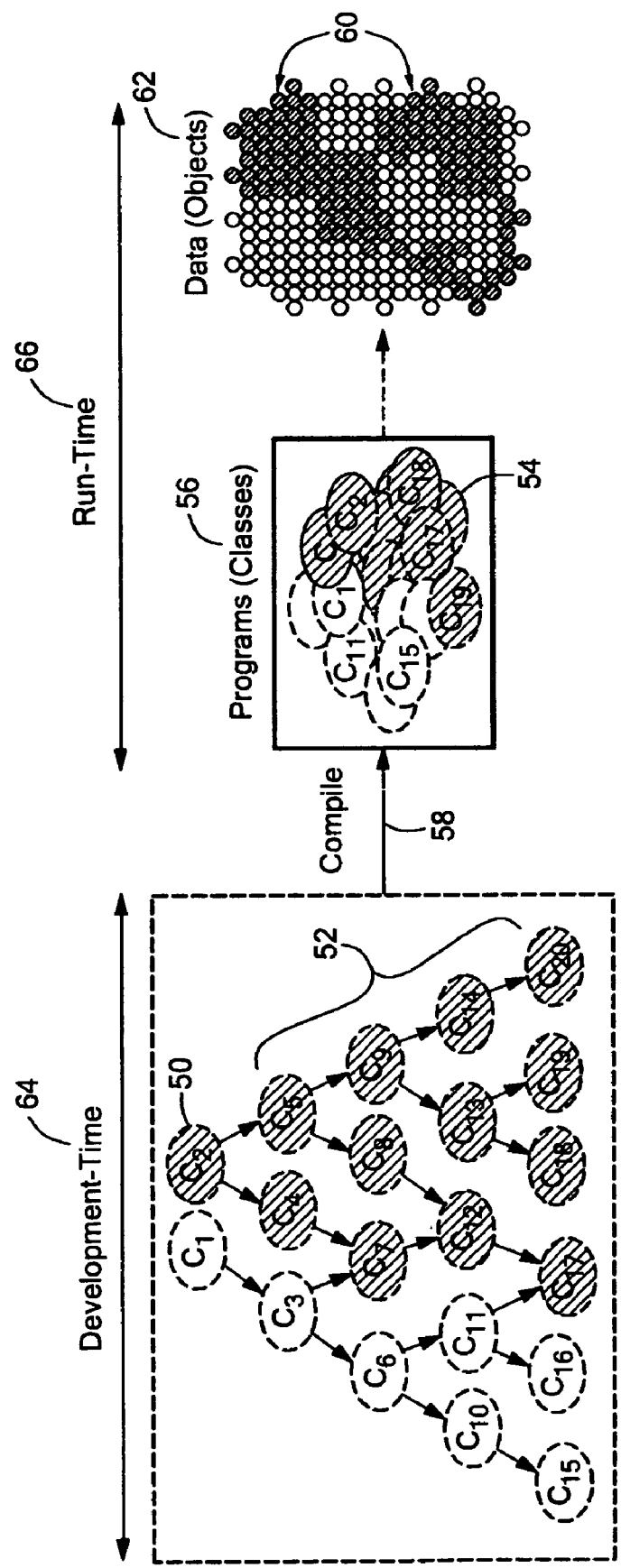
FIG. 4 is a block diagram illustrating how inheritance explodes combinatorial effects of modifications.
Figure 5:
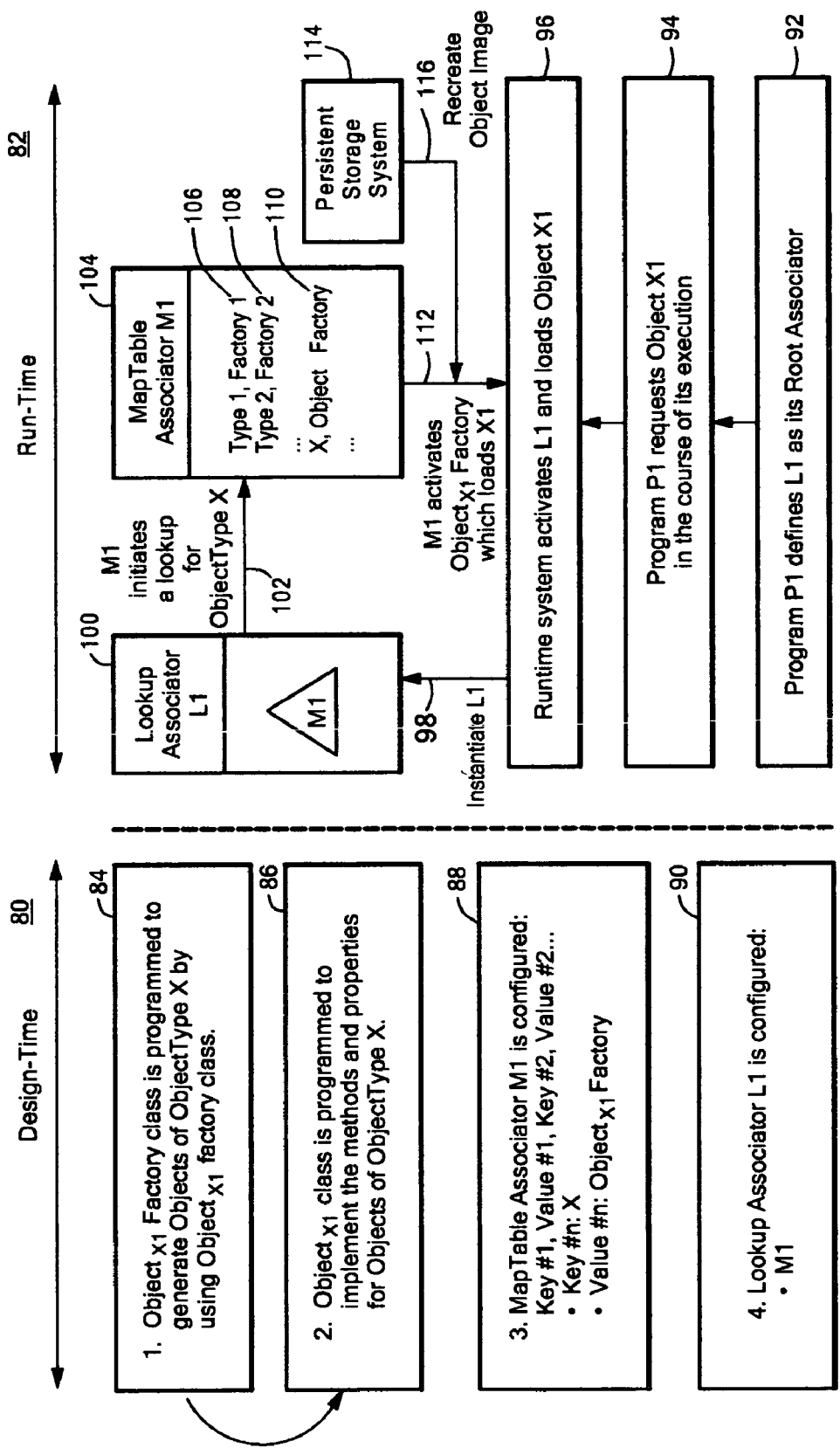
FIG. 5 is a block diagram illustrating an embodiment of the disclosed system.

As shown in FIG. 5, in an illustrative embodiment, the disclosed system may be described in terms of actions performed during software Design-Time 80 and software run time 82. Software Design-Time 80 may be considered the time period during which a software-based system is designed and/or developed, while software run time 82 may be considered the time period after the resulting software based system has been deployed, and has begun execution with regard to an intended application. Using this terminology, steps taken to perform "object definition" occur during Design-Time 80. These steps create built-in building blocks that provide architects and developers of software-based systems with the ability to design and develop persistent objects in a way that enables dynamic-late binding.

As further shown in FIG. 5, the run time period 82 involves the use of software objects referred to for purposes of explanation as MapTable Associators, (such as MapTable Associator M1 104), Lookup Associators (such as Lookup Associator L1 100), and Root Associators. The steps and interfaces described with regard to the run time period 82 relate to configuring the disclosed run time binding process, which provides software architects and system administrators with full control and flexible management of the late-binding process. Moreover, the disclosed Root Associators may be used during execution by a runtime environment of an embodiment of the disclosed system to support the late-binding resolution process.

For purposes of concise explanation, in the illustrative embodiment, object definition generally follows a contemporary "factory" approach. Accordingly, each implementation of an Object Type is comprised of two classes: one is an "Object Implementation" class providing the specific methods and properties for objects of the defined type, and the other is an "Object Factory" class providing a software source for actually creating objects of the given type. A preferred embodiment maintains both classes in a single source file, and provides a pre-programmed "Abstract Object" that all other objects are inheriting from. In such an embodiment, an "Abstract Object Implementation" is an abstract class providing, among other things, the following methods:

get_object_type—retrieves the object's type get_object_name—retrieves an object's name—for example, a unique identifier within a given type In this preferred embodiment, each specific object's implementation class inherits the above methods, which take care of maintaining each object's type and name in persistent storage, and manage their referential integrity. These methods enable the persistent objects of the disclosed system to be maintained across transactions, user sessions, and application executions, and are identified by unique, typed names. As noted above, the persistent objects may be maintained using the above methods in files, databases or any other type of persistent storage system, and using various media formats provided by contemporary persistent storage systems. Each specific object's implementation class also provides implementation of other specific methods and properties.

Further in the preferred embodiment, an "Abstract Object Factory" is an abstract class providing the fundamental methods that the actual Object Factory will need for creating objects of a given type, either by instantiating them in memory or restoring them from persistent storage, and provides the following methods:

load_object—retrieves an object from memory or re-creates it from persistent storage create_new object—creates the object's image in persistent storage update_object—updates the object's image in persistent storage remove_object—deletes the object's image from persistent storage The preferred embodiment further includes a customized class loader, which may use industry-standard techniques. As a result, when the factory class is instantiated, its pre-programmed Abstract Object Factory requests from the class loader the class implementing objects, and uses them in implementing the above methods.

A further general description of the "factory" approach to software engineering is found in "Design Pattern.s" by Erich Gamma, Richard Helm, Ralph Johnson, and John Vlissides. A similar general approach is referred to as the "Abstract Factory Design Pattern" in C++, Java® and Microsoft.Net® technical literature. Those skilled in the art will recognize that the present invention is not limited to using a factory based approach, and that other approaches to object definition and creation may be used consistent with the principles of the invention. Similarly, any specific object oriented programming language may be used to provide the features of the disclosed system, such as, for example, C++, Java® or C#, as well as any specific non object-oriented language having a runtime environment that supports dynamic allocation of memory or enables dynamic loading of static code.

As shown in FIG. 5 and further described below, Associators are software objects that make up the mapping engine that maps object types onto object factories. The preferred embodiment implements Associators as interfaces. For example, the Associators may be implemented as Java interfaces. Other specific mechanisms may be used, such as Interface Protocols used in some object oriented languages. Those skilled in the art will recognize that other embodiments may implement Associators using other software constructs such as abstract classes or data structures. Moreover, any specific kind of software module may be used to implement the disclosed Associators that is operable to input a key and return an indication of a corresponding object generating program. While the definition of each Associator is maintained in persistent storage, they are instantiated by the runtime system as memory objects. The Associators used by the disclosed system are:

1) MapTable Associators. A MapTable Associator responds to object types as keys, and provides indications of object factories (i.e. fully qualified class names) as resulting values. MapTable Associators enable multiple, different object types to be mapped to the same object factory class, even within the same Associator. In the preferred embodiment, within a given Associator, any specific object type can be associated with one and only one object factory class. Alternatively, the method for obtaining an object factory class by object type may be embodied to return a set of object factory classes, leaving it to the invoking application to determine which specific object factory class instance to use. The MapTable Associators enable the binding of a set of object types used in a shared execution context to the respective classes providing their implementation. The shared execution context may be identified by the MapTable Associator's name, and the specific binding of a given object type to the class that implements it in the given Associator can be changed dynamically, at any time at all, either programmatically or interactively, while being subjected to access rights defined by the program that practices this invention.

2) Lookup Associators. A Lookup Associator contains a sequence of MapTable Associators. The first MapTable Associator containing a mapping for a requested object type is used to provide a corresponding object factory class back to the caller application. A Lookup Associator can be changed dynamically, at any time, either programmatically or interactively, subject to any access rights limitations defined by a program embodying the disclosed system.

3) Root Associators. Each application activates a get_default_associator service, once per each run, allowing the runtime environment to create a memory object being a single instance of an Associator, called the Root Associator. The, Root Associator may, for example, be implemented as a Lookup Associator, containing one or more MapTable Associators to be used within the lookup path.

At step 84 in FIG. 5, an object factory class, for example $Object_{X1}$ factory class, is programmed to generate Objects of ObjectType X through use of an $Object_{X1}$ factory class. At step 86, an $Object_{X1}$ class is programmed to implement the methods and properties for Objects of ObjectType X. Also during Design-Time 80, at step 88 a MapTable Associator M1 104 is configured with regard to a number of key/value pairs that it contains. Each MapTable Associator in the illustrative embodiment of FIG. 5 includes some number of key/value pairs, such that a Key #1 is associated with a corresponding Value #1, a Key #2 is associated with a Value #2, etc. In step 88 of FIG. 5, a Key #n is configured to match Object Type X, and the corresponding Value #n is configured to indicate the $Object_{X1}$ Factory class. At step 90, a LookUp Associator L1 100 is configured to contain or indicate at least the MapTable Associator M1 104.

As further shown in FIG. 5, during the run time period 82, at step 92 a program P1 defines the Lookup Associator L1 100 as its Root Associator. Next, at step 94, program P1 requests an object instance during the course of its execution, for example an instance of ObjectType X referred to as $Object_{X1}$. Then, at step 96, the runtime system activates Lookup Associator L1 100, and loads $Object_{X1}$ of ObjectType X. For example, this action may include or result in instantiation 98 of Lookup Associator 100. As shown in FIG. 5, Lookup Associator 100 contains the MapTable Associator M1 104, and at step 102, as part of the run time system retrieving an instance of Object X, the MapTable Associator M1 104 initiates a lookup for ObjectType X. The MapTable Associator M1 104 includes a map 106 that associates art ObjectType Type 1 with a corresponding factory class Factory 1, and a mapping 108 that associates an ObjectType Type 2 with a corresponding factory class Factory 2. The MapTable Associator M1 104 further includes the mapping 110 that associates the ObjectType X with the object factory class $Object_{X1}$ Factory. The mapping 110 is used by the lookup 102 to activate 112 the $Object_{X1}$ Factory, which loads $Object_{X1}$ to satisfy the request from program P1 at step 94. For example, if $Object_{X1}$ already exists, it may be retrieved from memory.

Alternatively, the Object$_{X1}$ image may be recreated 116 from a persistently stored object image in persistent storage system 114.

Using the separation between Object definitions and Associator definitions provided by the disclosed system, it is advantageously possible to:

1) create multiple, different object definitions with respect to a single object type; and/or 2) create multiple, different Associators mapping object types to different object implementations, as presented by different corresponding object factories.

For example, in a first scenario, a painless change can be made to an existing application as follows:

a) an existing application is used, with an existing registry of Associators, and an existing database of persistent objects;

b) a developer develops his own implementations of one or more objects that he would like to behave differently—some of these may be new objects, others may be modified classifications of previously existing objects; and c) an update is performed to an Associator in the registry to map these specific object types to the object factories selected by the developer.

As a result, the application will behave differently the next time it is executed, but no one had to change the inheritance graph, recompile, re-link, re-test with respect to non-affected objects, and/or redeploy the application.

In a second scenario, a new application can "inherit" an existing one, and amend the existing applications behavior with respect to certain object types, as follows:

1) an existing application and an existing registry of Associators is used;

2) a developer develops her own implementation of one or more objects she would like to behave differently;

3) the developer adds a new MapTable Associator to the registry, mapping these specific object types to object factories selected by the developer; and 4) the existing Lookup Associator is changed by adding the new MapTable Associator to the head of the MapTable sequence, thereby making it the first to be selected as a default associator method, for example get_default_assosicator. Alternatively, the existing Lookup Associator could be left as-is, and a new Lookup Associator could be defined to provide the desired changes, and defined as the Root Associator. As a result, the new application executes just like the previously existing application, albeit while behaving differently when processing the revised objects.

Figure 6:
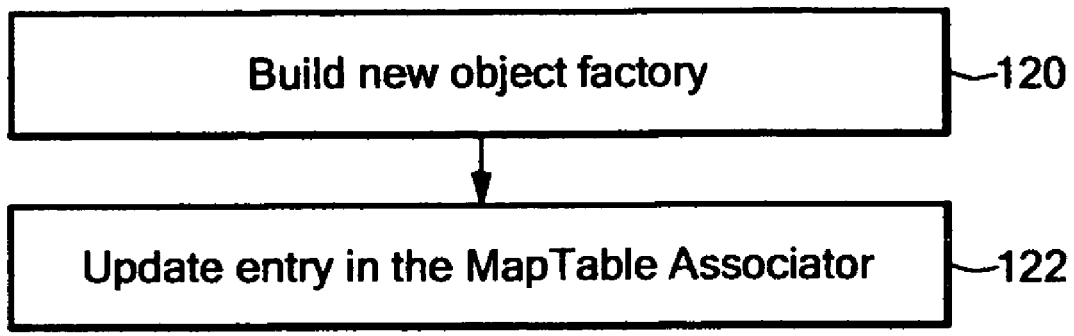
FIG. 6 is a flow chart illustrating steps performed to dynamically change the binding of an object type in an illustrative embodiment.

As shown in FIG. 6, an embodiment of the disclosed system may operate to dynamically change the binding of an object type. The steps shown in FIG. 6 provide an object type with a different implementation, by dynamically changing the object types binding its binding, while avoiding deployment related issues associated with prior systems that rely on inheritance graphs. At step 120, a new object factory is built, for example, Object$_{X2}$ factory class in the illustrative embodiment. At step 122, the entry in the MapTable Associator, for example MapTable Associator M1, for the relevant object type, for example ObjectType X is modified to indicate the new object factory. As a result of these steps, the binding of an object type to an object factory class is conveniently changed, while leaving the compile-time class structure and inheritance graph intact.

Figure 7:
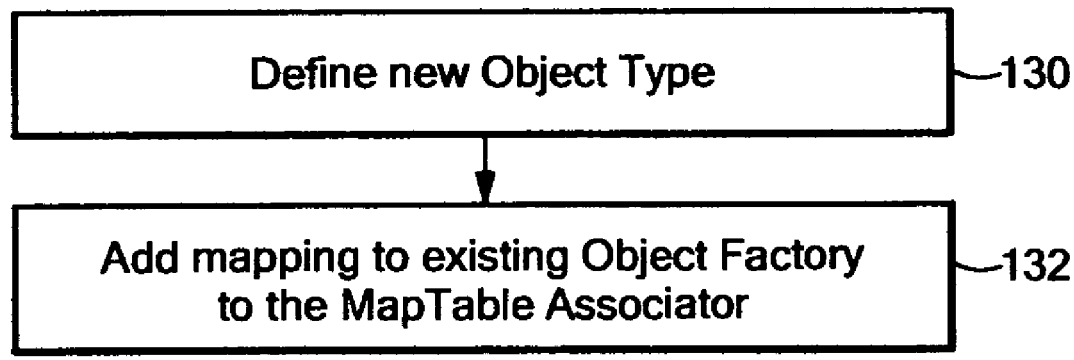
FIG. 7 is a flow chart illustrating steps to reuse an object implementation by registering multiple object types with the same object factory in an illustrative embodiment.

As shown in FIG. 7, an embodiment of the disclosed system may operate to reuse an object implementation by registering multiple object types with the same object factory class. At step 130, a new object type is defined, for example ObjectType Y. At step 132, a mapping for the new object type is added to the MapTable Associator. For example, a mapping of the new ObjectType Y to a previously existing object factory class Object$_{X1}$ factory as a new key/value pair.

Figure 8:
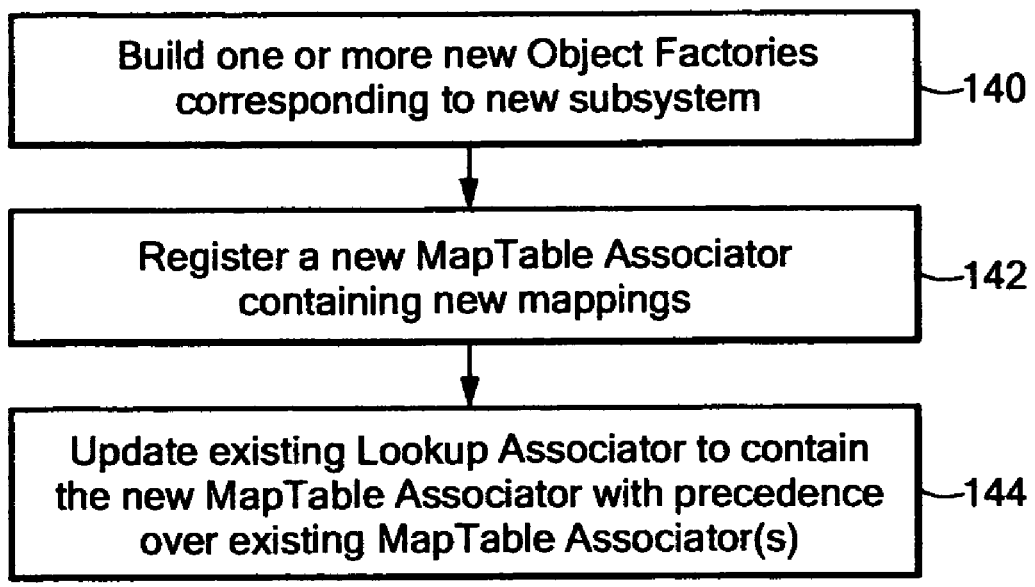
FIG. 8 is a flow chart illustrating steps to reuse and extend a software-based system by having the Lookup Associator control the integration process in an illustrative embodiment.

FIG. 8 shows how an illustrative embodiment may operate to reuse and extend a software-based system by having a Lookup Associator control the integration process. In such a case, an existing system may include many sub-systems, each managing a different set of objects. Developers may want to implement a new sub-system and integrate and test in without touching or breaking the complete existing set. At step 140, one or more new object factories are built. For example, a new Object$_{X2}$ factory implementing an existing ObjectType X may be built at step 140. At step 142, the new object factory is mapped to the existing object type. For example, a new MapTable Associator M2 containing new mappings of ObjectType X to Object$_{X2}$ factory may be registered at step 142. An existing Lookup Associator, such as Lookup Associator L1, is then updated to contain the new MapTable Associator with precedence over one or more previous MapTable Associators. For example, this may be accomplished by changing the MapTables list within Lookup Associator L1 from (M1) to (M2, M1), thereby allowing the new MapTable M2 to take precedence over the previous MapTable M2. If a failure occurs or a bug is detected, and/or there is uncertainty regarding the source of some new problem, either the new MapTable Associator M2 can be removed from Lookup Associator L1, or MapTable Associator M2 can conveniently be removed from Lookup Associator L1, and the system can resume operation without the modifications.

Figure 9:
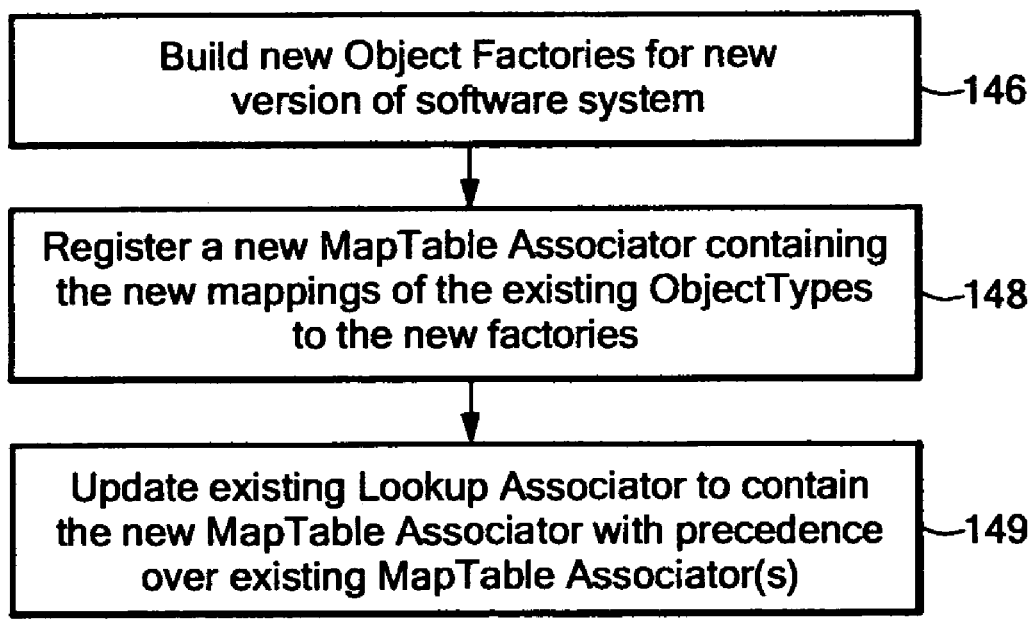
FIG. 9 is a flow chart further illustrating steps to manage changes in a software-based system by having the Lookup Associator control the staging process in an illustrative embodiment.

FIG. 9 show steps to manage changes in a software-based system by having a Lookup Associator control the staging process. This process may be used when Version 1 of the software system is deployed in the field, a Version 2 has been developed, and the goal is to deploy Version 2 incrementally without interrupting the operation of Version 1. At step 146, new Object Factories are built for the new version of the software system. For example, New Object Factories for a Version 2 of a software system may include new Object Factories Object$_{X2}$ factory through Object$_{Z2}$ factory implementing existing ObjectTypes X through Z. At step 148, a new MapTable Associator is registered containing mappings to the new Object Factories. For example, a new MapTable Associator M2 may be registered containing new mappings of ObjectTypes X through Z to the new Object Factories. Next, at step 149, a Lookup Associator is updated by adding the new MapTable Associator to its list of MapTable Associators, with priority over one or more existing MapTable Associators. For example, at step 149, a Lookup Associator L1 may be updated by changing the MapTable list it contains from (M1) to (M2, M1) thereby allowing the new MapTable M2 to take precedence over the existing MapTable M1.

Figure 10:
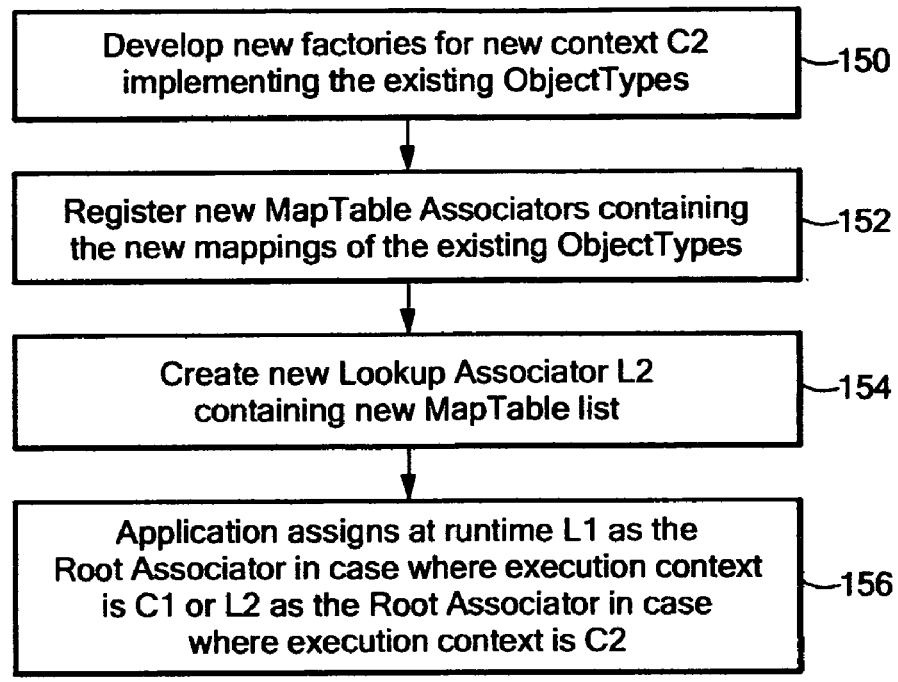
FIG. 10 is a flow chart illustrating steps to enable the same object type to be applied differently in different situations within the same application, using multiple Lookup Associators by assigning different Root Associators in different contexts.

FIG. 10 is a flow chart illustrating steps to enable the same object type to be applied differently in different situations within the same application, using multiple Lookup Associators by assigning different Root Associators in different execution contexts. In this process, multiple Lookup Associators can be used by assigning different Root Associators in different contexts. For example, existing implementations of ObjectTypes X . . . Z may need to be limited to a Context C1, which may be related to a single supplier or set of providers, or to any specific runtime context an application system may need to independently manage, and there may be a need to enable a new context C2. This may be the case for a large system whose development is split up among several developer teams, each one managing its own MapTable Associators M through P, so that the current Lookup Associator L1 contains MapTable Associator list (M,N,O,P). Accordingly, at step 150, new factories for the new context C2 are developed. For example, new factories $Object_{x2}$factory through $Object_{z2}$factory may be developed implementing existing ObjectTypes X through Z. Then at step 152, one or more new MapTable Associators (i.e. M2,N2,O2,P2) are registered containing the new mappings of the existing ObjectTypes to the new Object Factories, for use during the context C2. At step 154 a new Lookup Associator (i.e. L2) is created containing the new MapTable list (M2,N2,O02,P2). Then, at step 156, during runtime, the application assigns L1 as the Root Associator in when the execution context is C1, and L2 as the Root Associator when the execution context is C2.

Figure 11:
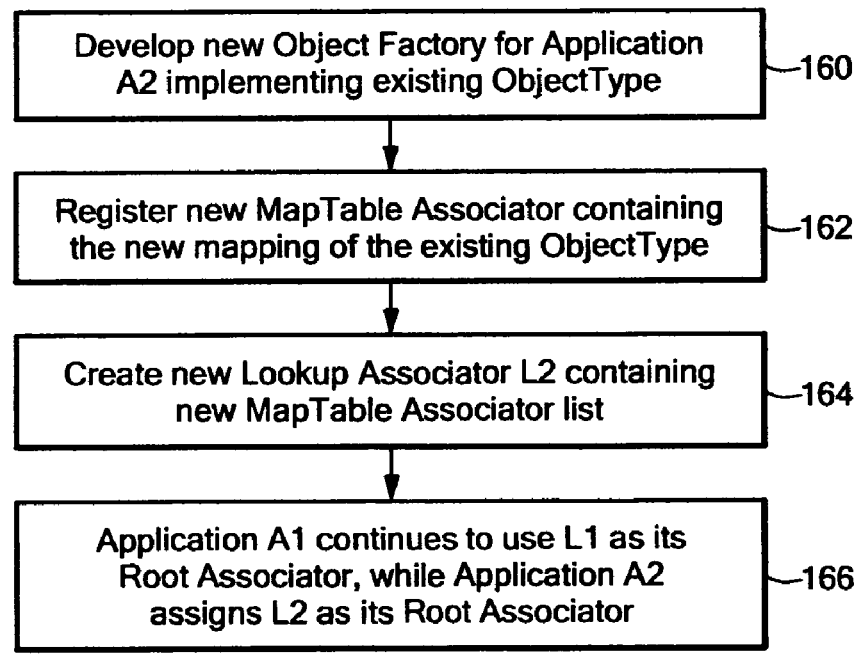
FIG. 11 is a flow chart illustrating steps to enable a new application to reuse an existing mapping but override the existing mapping with regard to a subset of its objects by using multiple Lookup Associators, and multiple Root Associators.

FIG. 11 is a flow chart illustrating steps to enable a new application to reuse an existing mapping but override the existing mapping with regard to a subset of its objects by using multiple Lookup Associators, and multiple Root Associators. This process may be used where there is an existing Application A1, for example an Internal system, and there is a need for a new Application A2, for example that is open to external users. Again, this may be the case where there a large system whose development is split into several teams, each one managing its own MapTable Associators (M,N,O,P), and where an existing Lookup Associator L1 contains a MapTable list (M,N,O,P). As shown in FIG. 11, at step 160, a new Object Factory (i.e. $Object_{x2}$FACTORY) is developed implementing an existing ObjectType (i.e. ObjectType X). A step 162 a new MapTable Associator (i.e. M2) is registered containing the new mapping of the existing ObjectType X to the new Object Factory ($Object_{x2}$factory). Next, at step 164 a new Lookup Associator (i.e. L2) is created containing a MapTable Associator list including the new MapTable Associator M2, having precedence over the MapTable Associators in the existing Lookup Associator L1. For example, the MapTable Associator list in Lookup Associator L2 may be (M2,M,N,O,P), with the new MapTable Associator M2 mappings having precedence over the mappings in the MapTable Associators (M,N, O,P) in the L1 MapTable list. Then at step 166, during runtime, the Application A1 continues to use Lookup Associator L1 as its Root Associator, while Application A2 assigns L2 as its Root Associator.

The Figures include block diagrams and flow chart illustrations of methods, apparatus (systems) and computer program products according to an embodiment of the invention. It will be understood that each block of the Figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program object structures, one skilled in the art will recognize that the system may be embodied using a variety of specific program object structures. Accordingly, the invention should not be viewed as limited except by the scope and spirit of the appended claims.

We claim:

1. A method for changing the binding of software objects to the program code that implements them, in accordance with a run-time object typing that is independent of a program code typing system, comprising:

defining a correspondence between an object type and corresponding object generating program code, wherein said corresponding object generating program code generates object instances of said object type;

maintaining said correspondence between said object type and said corresponding object generating program code independently from a pre-run time program code object hierarchy, wherein said correspondence is maintained within a mapping software construct, wherein said mapping software construct maps said corresponding object generating program code to said object type, wherein said mapping software construct is one of a plurality of mapping software constructs, and wherein said plurality of mapping software constructs are maintained within a lookup software construct, wherein said lookup software construct operates to determine said corresponding object generating program code responsive to said object type, and wherein said lookup software construct is one of a plurality of lookup software constructs; and selecting, at run-time, said corresponding object generating program code from among a plurality of alternative, run-time selectable object generating programs, wherein each of said plurality of run-time selectable object generating programs generates object instances of said object type, and wherein said selecting is initiated by activating said one of said plurality of lookup software constructs to operate to determine said corresponding object generating program code responsive to said object type.

2. The method of claim 1, wherein said pre-run time program code object hierarchy comprises a compile time program code object hierarchy.

3. The method of claim 1, wherein said pre-run time program code object hierarchy comprises a link time program code object hierarchy.

4. The method of claim 1, further comprising:

receiving, at run time, a request for one or more objects of said object type;

determining, at run-time, responsive to said correspondence between said object type and said object generating program code, objects of said object type; and instantiating said objects of said object type using said object generating program code determined responsive to said correspondence between said object type and said object generating program code.

5. The method of claim 4, further comprising persistently storing said objects across a plurality of user sessions.

6. The method of claim 4, further comprising persistently storing said objects across a plurality of executions of software programs accessing and processing said objects.

7. The method of claim 4, further comprising persistently storing said objects across a plurality of transactions with software programs accessing and processing said objects.

8. The method of claim 4, wherein each of said at least one persistent object is associated with said object type, and wherein said persistent object is identified by a name being unique relative to the names of all other persistent objects associated with said object type.

9. The method of claim 1, further comprising modifying said plurality of mapping software constructs at run time.

10. The method of claim 9, wherein said modifying of said plurality of mapping software constructs further comprises adding a new mapping software construct to said plurality of mapping software constructs.

11. The method of claim 10, wherein said adding of said new mapping software construct to said plurality of mapping software constructs comprises updating at least one lookup software construct such that said new mapping software construct takes precedence over at least one previously existing mapping software construct.

12. The method of claim 10, wherein said modifying of said plurality of lookup software constructs comprises adding at least one new lookup software construct to said plurality of lookup software constructs.

13. The method of claim 1, further comprising modifying said plurality of lookup software constructs at run time.

14. A computer program product including a computer readable medium, said computer readable medium having program code for changing the binding of software objects to the program code that implements them, in accordance with a run-time object typing that is independent of a program code typing system stored thereon, said program code comprising:

program code operative to define a correspondence between an object type and corresponding object generating program code, wherein said corresponding object generating program code generates object instances of said object type;

program code operative to maintain said correspondence between said object type and said corresponding object generating program code independently from a pre-run time program code object hierarchy, wherein said correspondence is maintained within a mapping software construct, wherein said mapping software construct maps said corresponding object generating program code to said object type, wherein said mapping software construct is one of a plurality of mapping software constructs, and wherein said plurality of mapping software constructs are maintained within a lookup software construct, wherein said lookup software construct operates to determine said corresponding object generating program code responsive to said object type, and wherein said lookup software construct is one of a plurality of lookup software constructs; and program code operative to select, at run-time, said corresponding object generating program code from among a plurality of alternative, run-time selectable object generating programs, wherein each of said plurality of run-time selectable object generating programs generates object instances of said object type, and wherein said program code operative to select said corresponding object generating program code is initiated by activating said one of said plurality of lookup software constructs to operate to determine said corresponding object generating program code responsive to said object type.

15. The computer program product of claim 14, wherein said pre-run time program code object hierarchy comprises a compile time program code object hierarchy.

16. The computer program product of claim 14, wherein said pre-run time program code object hierarchy comprises a link time program code object hierarchy.

17. The computer program product of claim 14, said program code further comprising:

program code operative to receive, at run time, a request for one or more objects of said object type;

program code operative to determine, at run-time, responsive to said correspondence between said object type and said object generating program code, objects of said object type; and program code operative to instantiate said objects of said object type using said object generating program code determined responsive to said correspondence between said object type and said object generating program code.

18. The computer program product of claim 17, said program code further comprising program code operative to persistently store said objects across a plurality of user sessions.

19. The computer program product of claim 17, said program code further comprising program code operative to persistently store said objects across a plurality of executions of software programs accessing and processing said objects.

20. The computer program product of claim 17, said program code further comprising program code operative to persistently store said objects across a plurality of transactions with software programs accessing and processing said objects.

21. The computer program product of claim 17, wherein each of said at least one persistent object is associated with said object type, and wherein said persistent object is identified by a name being unique relative to the names of all other persistent objects associated with said object type.

22. The computer program product of claim 14, said program code further comprising program code operative to modify said plurality of mapping software constructs at run time.

23. The computer program product of claim 22, wherein said program code operative to modify said plurality of mapping software constructs further comprises program code operative to add a new mapping software construct to said plurality of mapping software constructs.

24. The computer program product of claim 23, wherein said program code operative to add said new mapping software construct to said plurality of mapping software constructs comprises program code operative to update at least one lookup software construct such that said new mapping software construct takes precedence over at least one previously existing mapping software construct.

25. The computer program product of claim 23, wherein said program code operative to modify said plurality of lookup software constructs comprises program code operative to add at least one new lookup software construct to said plurality of lookup software constructs.

26. The computer program product of claim 14, said program code further comprising program code operative to modify said plurality of lookup software constructs at run time.

27. A computer system including at least one processor and a computer readable memory having stored thereon program code which, when executed on said at least one processor, causes said computer system to change the binding of software objects to the program code that implements them, in accordance with a run-time object typing that is independent of a program code typing system, said program code stored on said computer readable memory comprising:

means for defining a correspondence between an object type and corresponding object generating program code, wherein said corresponding object generating program code generates object instances of said object type;

means for maintaining said correspondence between said object type and said corresponding object generating program code independently from a pre-run time program code object hierarchy, wherein said correspondence is maintained within a mapping software construct, wherein said mapping software construct maps said corresponding object generating program code to said object type, wherein said mapping software construct is one of a plurality of mapping software constructs, and wherein said plurality of mapping software constructs are maintained within a lookup software construct, wherein said lookup software construct operates to determine said corresponding object generating program code responsive to said object type, and wherein said lookup software construct is one of a plurality of lookup software constructs; and means for selecting, at run-time, said corresponding object generating program code from among a plurality of alternative, run-time selectable object generating programs, wherein each of said plurality of run-time selectable object generating programs generates object instances of said object type, and wherein said selecting is initiated by activating said one of said plurality of lookup software constructs to operate to determine said corresponding object generating program code responsive to said object type.

28. The system of claim 27, wherein said pre-run time program code object hierarchy comprises a compile time program code object hierarchy.

29. The system of claim 27, wherein said pre-run time program code object hierarchy comprises a link time program code object hierarchy.

30. The system of claim 27, further comprising:

means for receiving, at run time, a request for one or more objects of said object type;

means for determining, at run-time, responsive to said correspondence between said object type and said object generating program code, objects of said object type; and means for instantiating said objects of said object type using said object generating program code determined responsive to said correspondence between said object type and said object generating program code.

31. The system of claim 30, further comprising means for persistently storing said objects across a plurality of user sessions.

32. The system of claim 30, further comprising means for persistently storing said objects across a plurality of executions of software programs accessing and processing said objects.

33. The system of claim 30, further comprising means for persistently storing said objects across a plurality of transactions with software programs accessing and processing said objects.

34. The system of claim 30, wherein each of said at least one persistent object is associated with said object type, and wherein said persistent object is identified by a name being unique relative to the names of all other persistent objects associated with said object type.

35. The system of claim 27, further comprising means for modifying said plurality of mapping software constructs at run time.

36. The system of claim 35, wherein said means for modifying said plurality of mapping software constructs further comprises means for adding a new mapping software construct to said plurality of mapping software constructs.

37. The system of claim 36, wherein said means for adding said new mapping software construct to said plurality of mapping software constructs comprises updating at least one lookup software construct such that said new mapping software construct takes precedence over at least one previously existing mapping software construct.

38. The system of claim 36, wherein said means for modifying said plurality of lookup software constructs comprises adding at least one new lookup software construct to said plurality of lookup software constructs.

39. The system of claim 27, further comprising means for modifying said plurality of lookup software constructs at run time.

* * * * *